United States Patent [19]

Wilson et al.

[11] 3,742,124

[45] June 26, 1973

[54] COLOR INFRARED DETECTING SET

[75] Inventors: Jesse C. Wilson, Richardson; Melvin J. Borel, Carrollton; Charles B. Weaver, Dallas, all of Tex.

[73] Assignee: Texas Instruments Incorporated, Dallas, Tex.

[22] Filed: Aug. 16, 1971

[21] Appl. No.: 171,838

[52] U.S. Cl. .......... 178/5.2 R
[51] Int. Cl. .......... H04n 9/02
[58] Field of Search .......... 178/5.4 R, 5.2 R, 178/DIG. 2; 250/83.3 H

[56] References Cited

UNITED STATES PATENTS

| | | | |
|---|---|---|---|
| 2,848,626 | 8/1958 | Brackmann | 73/355 R |
| 3,078,341 | 2/1963 | Willey | 178/6.8 |
| 3,508,051 | 4/1970 | Nichols et al. | 250/65 |

OTHER PUBLICATIONS

RCA TN No. 188.

*Primary Examiner*—Richard Murray
*Attorney*—Samuel M. Mims, Jr., Alva H. Bandy et al.

[57] ABSTRACT

A color infrared detecting set is provided which utilizes the variation of emissivity of objects to add the effect of color to the sensing and presentation format. With color added to brightness a large number of shade combinations are possible and a large visible distinction between objects is realized. Color image signals are obtained by infrared energy passing through filters of different wavelengths (for a range of detection interest) to corresponding detectors which convert the infrared energy to electrical signals. The electrical signals are amplified, weighted and summed in one channel to produce a brightness signal, and processed in another channel to produce a plurality of color-difference signals. The brightness signal drives a plurality of light modulators, and each light modulator receives a color perturbation signal derived from the color-difference signals to obtain a color signal representative of one of the tristimulus values. The color signals are combined to produce an image of brightness equal to a black and white image, but having an apparent hue.

24 Claims, 10 Drawing Figures

Inventors
Jesse C. Wilson
Melvin J. Borel
Charles B. Weaver
By Alvo H. Bandy
Attorney

COLOR INFRARED DETECTING SET

BACKGROUND OF THE INVENTION

1. Field of the Invention

This invention relates to a radiant energy detecting system and more particularly to a color infrared detecting system.

2. Description of the Prior Art

In the past, infrared detecting sets have comprised a receiver, recorder, and associated electronics sensitive only to total signal magnitudes, hereinafter referred to as black and white infrared detecting sets. A typical system employs as the receiver a time scanning unit having a set of reflective or refractive optics, a rotating scan mirror, and a detector assembly in which the rotating mirror scans the object and the set of reflective or refractive optics focuses the infrared energy from the scanned object onto the detector assembly. If a rectangular mirror having four surfaces is used each rotation of the mirror produces four scans. The detector converts the infrared energy to an electrical signal which is processed by the associated electronics to a video signal. The video signal is used to modulate a glow tube which applies light to a set of rotating microscopes. Each microscope corresponds to one side of the scan mirror and is rotated in phase with it. Thus, as the scan mirror sweeps the object, the microscopes focus the light of the glow tube to a fine point for exposure of a roll of photographic film. Black and white film only has been used and by varying the amplification of the signal for the glow tube the shades of gray can be controlled from white to black.

As infrared energy is not visible to the eye, no color has been associated with it and although three major areas for improvement exist the development of scanners, the development of target and background signatures at infrared wavelengths, and the development of signal processing and recording - the scanning technology has developed far ahead of the other two areas. Highly sophisticated scanners exist today which provide systems, such as mapping systems, with resolution and velocity-to-height ratios suitable for almost any requirement. Despite various new scanning and recording systems, the video signal information has remained largely unchanged, that is, until the present invention.

In black and white infrared detecting sets used as mapping devices, several problems exist. One such problem is referred to as the "cross over" effect. The term "cross over" effect describes the situation occurring when, for example, during exposure to the sun the earth is warmer than a body of water, and during nonexposure the temperature of the earth becomes equal to and then "crosses over" to become cooler than the body of water. Another problem is the effect of reflected ground radiance from clouds above the black and white infrared mapping device. This cloud reflected energy tends to produce a blackbody or no contrast effect.

SUMMARY OF THE INVENTION

It is an object of the present invention to provide an improved infrared detecting set.

Another object is to provide an infrared mapping apparatus which utilizes the unique emissivity variations of target objects.

A further object of the invention is to provide an apparatus which adds color intelligence to the brightness information of the typical black and white system.

Still another object of the invention is to provide an infrared mapping apparatus which utilizes the variation of emissivity of objects to add the effect of color to the sensing and presentation format.

Still a further object of the present invention is to provide an infrared detecting set for identifying an object from its spectral signature.

Yet another object of the invention is to eliminate cross over effects normally associated with infrared collection and analysis.

Yet a further object of the invention is to provide an infrared detecting set which combines spectral emissivity information with the normal thermal information for more detailed analyses of imagery.

Still yet another object of the invention is to provide an infrared detecting set which alleviates the effect of reflected radiance such as ground radiance reflected by clouds.

Briefly stated the invention is to impose color information on virtually the same black and white information of prior infrared detector systems. According to the following equation infrared energy is dependent on two properties; namely, the temperature and emissivity of the object being analyzed.

$$I = \sigma E T^4$$

where $I$ = infrared power emitted from an object
$\sigma$ = Stefan-Boltzmann constant
$E$ = emissivity
$T$ = temperature of object in degrees Kelvin Thus, the present invention utilizes the variation of emissivity of objects to add the effect of color to the sensing and presentation format. With color added to brightness a large number of shade combinations are possible, and a large visible distinction between objects is therefore realizable. Brightness is defined as the characteristic of light that gives a visual sensation of more or less light, and emissivity is defined as the ratio of the radiation emitted by a surface to the radiation emitted by a perfect blackbody radiator at the same temperature.

In its simplest form, the color infrared detecting set constituting the subject matter of this invention includes a color infrared electronic processing scheme which utilizes a receiver operating in three different and distinct spectral regions representative of the red, blue and green color spectrum used to produce information on color film.

Each region is defined by a detector and a filter which allows only energy of the power wavelength to pass. The detected signal due to the energy passing each filter is processed through a video processing and enhancement control system to provide a signal indicative of the intensity or brightness of the source, hereinafter referred to as either an intensity or brightness signal, which drives light modulators that make up one channel and color-difference signals which are introduced as a perturbation on the intensity signal at each of the light modulators and therefore are referred to hereinafter as color perturbation signals. The intensity signal is adjusted by varying the amplification (gain) to provide the full range of grays. The color difference signals are adjusted to zero while scanning two blackbody targets of different temperatures so that the color information is primarily dependent on the emissivity of an object and not its temperature. Thus, functionally, the video signal of the color system is a composite signal from two channels — one channel carrying the intensity signal, the other carrying three color-difference signals used to yield an enhanced color signal having different tristimulus values. The combined three color signals do not effect the total brightness of the combined light sources but do effect their apparent hue.

BRIEF DESCRIPTION OF THE DRAWINGS

A detailed description of a preferred embodiment of this invention follows with reference being made to the drawings wherein like parts have been given like reference numerals for clarity and understanding of the elements and features of the invention.

Referring to FIG. 1, the Color Infrared Detecting Set 10 construction of the present invention comprises a receiver system 12, a video signal processing and enhancement control system 14, and a display or recorder system 16.

Figure 2:
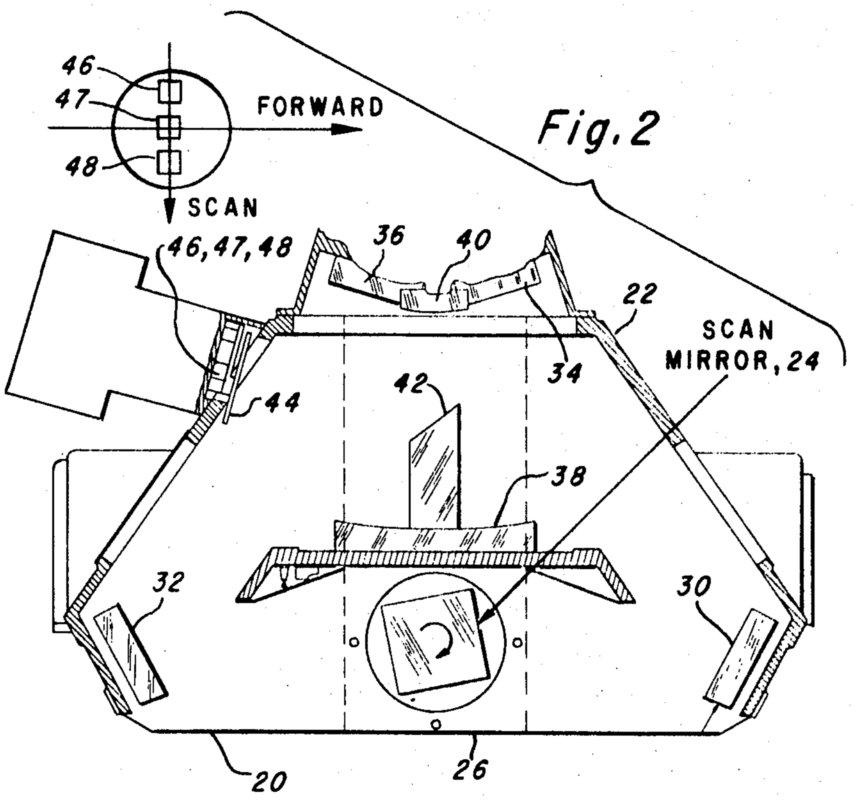
FIG. 2 is a sectional view showing the arrangement of the receiver optics for the color infrared detecting set invention.
Figure 10:
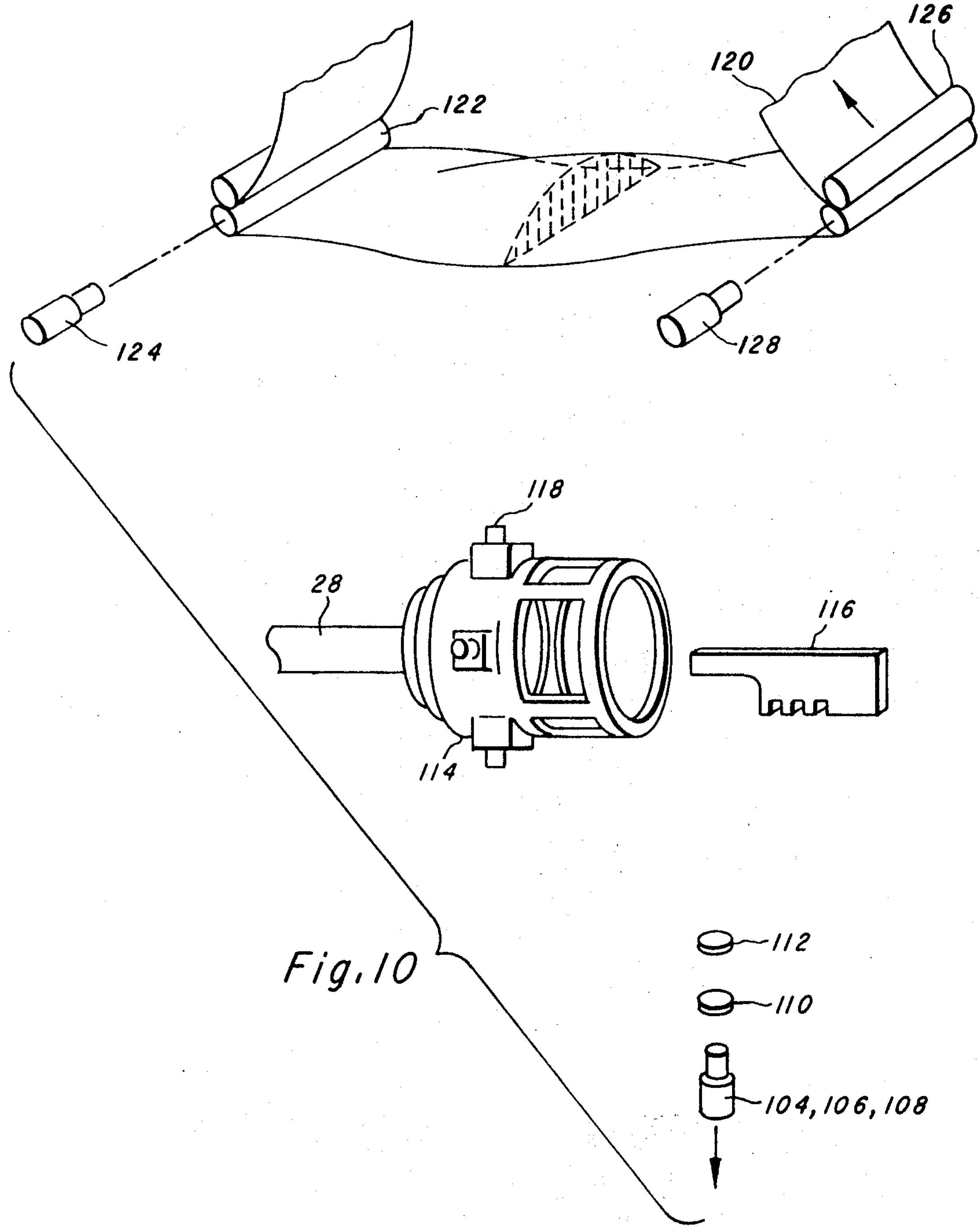
FIG. 10 is an exploded view showing in perspective the recorder for the color infrared detector system invention.

The receiver system 12 may be constructed in many ways, however, a suitable receiver includes a scanner 20 (FIG. 2) having a housing 22 housing a rotatable optical scanning mirror 24 adjacent a housing aperture 26 which admits infrared energy of an object being scanned. The mirror 24 which is made of a suitable material such as quartz, Pyrex, or metal, is rotatably mounted upon a scan mirror shaft 28 (FIG. 10) connected to a motor not shown for rotation about its axis of symmetry. The mirror 24 (FIG. 2) may have two or more reflecting surfaces, but as shown has four surfaces which produce four scan lines of an object with each rotation of the mirror shaft. In this configuration the optical scanning mirror 24 provides two optical mirrored faces rotating through a scan of 180°, thereby enabling the scanner 20 to collect radiant energy impinging thereon throughout an effective scan of 120°. Assuming a clockwise rotation of the four sided mirror 24, the radiant energy striking a first face or surface of the mirror is reflected towards a flat surface reflecting mirror 30 and another portion of the radiant energy impinging on a second face of the mirror 24 is reflected onto a flat surface reflecting mirror 32. Hence, there is obtained a split image from the effective spot area from which radiant energy waves are to be collected. As the four-sided mirror rotates clockwise about its axis of symmetry, the amount of radiant energy reflected by the first face or surface of mirror 24 towards mirror 30 and impinging thereon varies from a maximum to a minimum; and, radiant energy impinging on the second face of the scanning mirror 24 is reflected toward mirror 32 and the radiant energy impinging on mirror 32 goes from a minimum to a maximum. Consequently, a constant optical aperture is maintained within the effective scan of 120°.

The radiant energy impinging on flat surface reflecting mirror 30 is directed to mirror 34 and the radiant energy impinging on mirror 32 is directed towards mirror 36. Mirror 34 and mirror 36 direct respective portions of the split bundle of radiant energy collected by rotating scanning mirror 24 towards paraboloidal mirror 38 which collects and focuses the bundle of radiant energy and directs it to a convex mirror 40 which directs the converging bundle of radiant energy toward a mirror 42 having a surface positioned to direct the bundle of radiant energy through a filter 44 having three wavelength regions X, Y and Z to infrared detectors 46, 47, and 48. The image produced is a moving picture of the object, which would be the terrain in a mapping system, passing through the three regions X, Y and Z of the filter 44. The infrared detectors may be constructed of any suitable material such as lead tin telluride, indium antimonide, lead sulfide, mercury-doped germanium, or mercury cadmium telluride having a proper sensitivity.

Figure 3:
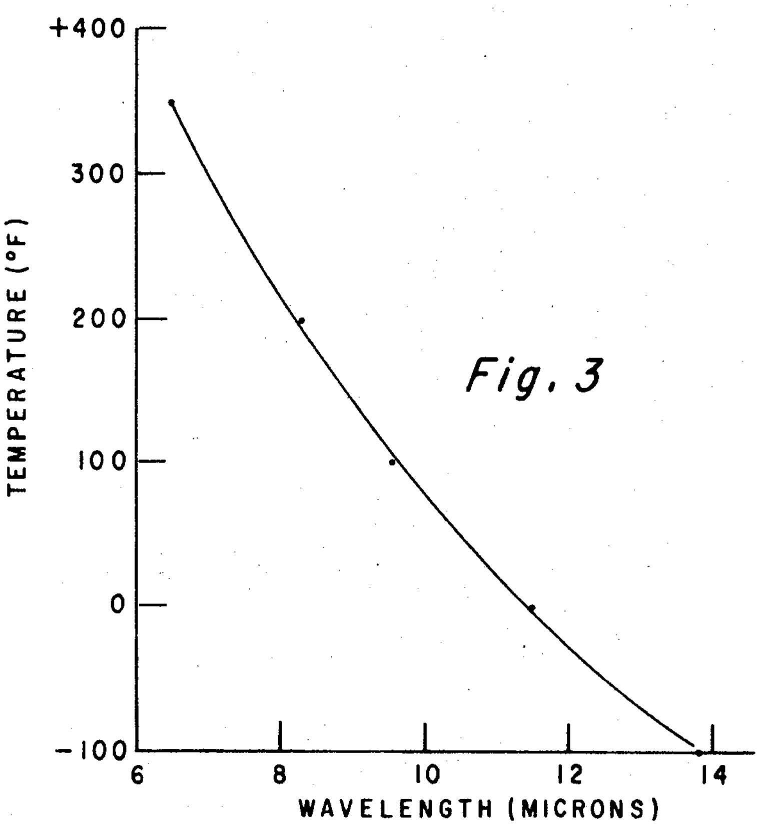
FIG. 3 is a graph of peak wavelengths as a function of temperature.
Figure 4:
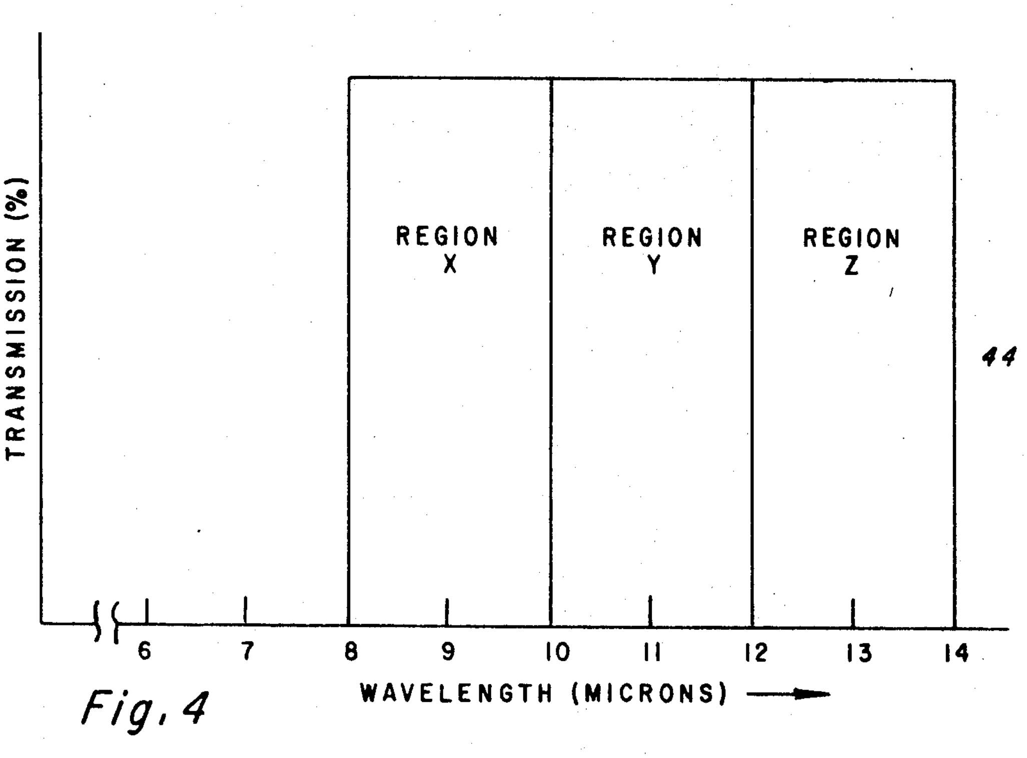
FIG. 4 is a graph defining the detectors filter bandpass regions.

Referring to FIG. 3 the range of temperatures of objects and the types of materials to be detected determine the peak wavelengths of the three regions X, Y and Z of the filter 44. For example, for an infrared color terrain mapping system, which will be used in describing this invention, most objects of any significances are within the +1000° Farenheit to −60° Farenheit which have peak wavelengths of from 3.0 to 14.0 micrometers ($\mu$m). For ambient temperatures, i.e., 110° Farenheit to −60° Farenheit the peak wavelengths are from 8.0 to 14.0 $\mu$m. Further it has been found that atmospheric attenuation due to moisture covers the 6.0 to 8.0 $\mu$m region. Hence, for a color terrain mapping system an 8.0 to 14.0 $\mu$m spectral band is preferred. The spectral band is divided into a plurality of regions of any suitable band width, which may be, for example, with each Region X, - 8.0 to 10.0 $\mu$m, Region Y, - 10.0 to 12.0 $\mu$m, and Region Z, - 12.0 to 14.0 $\mu$m (FIG. 4). The filter 44 may be, for example, a typical germanium substrate with a multilayer bandpass coating of magnesium oxide.

Before proceeding with the description of the video signal processing and enhancement control system 14 the function of the detectors as to the emissivity and detectivity of the set is discussed. Infrared system sensitivity is generally expressed as either the necessary power received at the system aperture and detected by the infrared detector to provide a unity signal-to-noise ratio or the temperature difference between two bodies necessary to provide a unity system signal-to-noise ratio. The development of a sensitivity equation depends usually only on the detector-preamplifier assembly, except when detectors are summed to yield a higher detectivity.

In the infrared color system of this invention, the sensitivity is modified as the spectral signals are processed, and must be considered if any meaningful sensitivity equation is to be derived. The complete electronics package of the signal processor is treated as a black-box, and suitable coefficients that modify the detectivity of the individual detector are included to take account of the added noise introduced by the signal processor.

The responsitivity is defined as the signal level per watt of incident radiant power of the detector; the responsivity depends upon spectral distribution of this power as well as upon the detector.

$$R_v = \text{(rms output voltage)/(rms power incident upon the detector)} \quad \text{(I)}$$

where $R_v$ is measured in rms volts/rms watts and is semiconstant for a detector and its preamplifier.

In a color system, two detection assemblies are used basically, and their difference signal or system-response signal may be looked upon as the output signal resulting from the difference in the radiation flux of two bandpasses of the detection assemblies.

Noise levels for operating detectors determine the detector threshold signal levels. The noise equivalent power (NEP) of a detector system for a source is the amount of spectral radiant power difference from the source which will produce a signal level equal to the rms-noise level. Therefore, $$\text{NEP} = \text{(rms internal noise level)}/(R_v) \quad \text{(II)}$$

The internal noise level is made up of the noise levels of the individual detectors which are basically background-noise limited. For the two-unit detector assembly used as an example, the noise contributes a factor of $\sqrt{2}$ of the noise level of one detector because of the lack of correlation in the noise signals.

The detectivity is defined as $$D = R_v/\text{(rms noise level)} \quad \text{(III)}$$

and for this system the detectivity would have the form $$D_{sys} = (R_v/\text{(rms noise level of one detector unit } \sqrt{2}) \quad \text{IV}$$

or $$D_{sys} = D/\sqrt{2} \quad \text{V}$$

where D is the detectivity of the detector.

In this light, the detectivity of the complete color system is related to the detectivity of one detector unit.

In this color system, the final mathematical function for the color signal has the form $$2A - B - C \quad \text{VI}$$

If $A$ were to increase by $\Delta A$ above $B$ and $C$, then there would be an increase in signal level by $2\Delta A$.

The noise level of this system would increase above the noise level of a single-channel system as follows. The $A$ signal is summed with itself; thus, there is a direct correlation in the noise signals, and the noise level is doubled. $A$, $B$, and $C$ are independent noise sources. If $\sigma_i$ is the standard deviation (rms noise value) of each distribution, then combining the noise source results in $$\sigma_i^2 = \Psi^2 + \sigma_B^2 + \sigma_C^2 \quad \text{(VII)}$$

where $\sigma_t^2$ is the variance (power noise level) of the noise resulting from the addition of several noise sources. The term $\Psi$ is the variance of the noise resulting from the addition of A to itself, thus $$\Psi^2 = 4\sigma_A^2 = (2\sigma_A)^2 \quad \text{(VIII)}$$

since $\sigma_A$, $\sigma_B$, and $\sigma_C$ are the same order of magnitude in this type of system $$\sigma_A \cong \sigma_B \cong \sigma_C \quad \text{(IX)}$$

then $$\sigma_t^2 = 6\sigma_{avg}^2 \quad \text{(X)}$$

where $\sigma_{avg}^2$ is the average of the variance of the detectors.

Thus, the signal increases by a factor of 2 and the noise increases by a factor of $\sqrt{6}$. This results in a detectivity corresponding to a change of the detectivity of a one-detector system $2/\sqrt{6} = 0.816$.

The Stefan-Boltzmann relation for a graybody is $$W = \epsilon \int_{\lambda_1}^{\lambda_2} W_\lambda d\lambda \quad \text{(XI)}$$

where $$W = C_1/(\lambda^5[\exp(C_2/T) - 1])$$

where $W$ = total radiant emittance
$C_1$ = Planck's first constant, $3.74 \times 10^{-12}$
$C_2$ = Planck's second constant, 1.44 cm-degree
$\lambda$ = wavelength in $\mu$m
$T$ = tempetature in K
$\epsilon$ = emissivity The response of the detectors is adjusted, as hereinafter described, so that for a given change in temperature the detector preamplifier assembly yields the same response in one bandpass as another, and the power difference between two bandpasses created by a change in emissivity between them is considered as a change in power in one bandpass if the detectivity is altered. Or, $$\Delta W = \epsilon_1 \int_{\lambda_1}^{\lambda_2} W_\lambda d_\lambda - \int_{2\lambda_2}^{\lambda_2} W_\lambda d\lambda \quad \text{(XII)}$$

considering $$\int_{\lambda_1}^{\lambda_2} W_\lambda d_\lambda = \int_{\lambda_2}^{\lambda_2} W_\lambda d\lambda \qquad \text{(XIII)}$$

then $$\Delta W = (\epsilon_1 - \epsilon_2) \int_{\lambda_1}^{\lambda_2} W_\lambda d\lambda \qquad \text{(XIV)}$$

is the incremental power input representative of a change in emissivity between the two optical bandpasses. The term $\Delta W$ is in watts/cm². The power of incident radiation per solid angle is given by $$\frac{\Delta W}{\pi} = \frac{\Delta\epsilon \int_{\lambda_1}^{\lambda_2} W_\lambda d\lambda}{\pi} \qquad \text{(XV)}$$

where $\Delta\epsilon = \epsilon_1 - \epsilon_2$ and $\Delta W/\pi$ is in watts/cm² steradian $$\frac{\Delta P(A_t)}{\pi} = \frac{A_T \Delta\epsilon \int_{\lambda_1}^{\lambda_2} W_\lambda d\lambda}{\pi} \text{ watts/steradian} \qquad \text{(XVI)}$$

Then the noise equivalent power is $$NEP = \frac{A_t \Omega \Delta\epsilon}{\pi} = \frac{A_t \Omega \Delta \int_{\lambda_1}^{\lambda_2} W_\lambda d\lambda}{\pi} \qquad \text{(XVII)}$$

where $$\Omega = A_1/R^2$$

where
$R$ = the range to target
$A$ = the area of the aperture $$A_T/R^2 = A_d/f^2$$

$$NEP = \frac{A_T A_0 \Delta\epsilon \int_{\lambda_1}^{\lambda_2} W_\lambda d\lambda}{\pi R^2} \qquad \text{(XVIII)}$$

where $A_T = (R \cdot \Delta\Theta)^2$ $$NEP = \frac{\Delta\epsilon A_0 (\Delta\theta)^2 \int_{\lambda_1}^{\lambda_2} W_\lambda d\lambda}{\pi} \qquad \text{(XIX)}$$

Detectivity is defined as $$D = 1/NEP \qquad \text{(XX)}$$

A special kind of detectivity ($D^*$) has unit noise bandwidth and detector area:

$$D^* = (A_d \Delta f)^{1/2} D \qquad \text{(XXI)}$$

$$D^* = [(A_d \Delta f)^{1/2}]/NEP \qquad \text{(XXII)}$$

where $D^*$ is in cm-(Hz)$^{1/2}$ per watt
$A_d$ = detector cell area
$\Delta f$ = noise equivalent bandwidth
NOTE: $D^*$ is a function of field of view and preamplifier used.

$$NEP = (A_d \Delta f)^{1/2}/0.82 D^* \qquad \text{(XXIII)}$$

where the coefficient 0.82 is the degradation factor for the system signal processing explained earlier. Therefore, if $\Delta\epsilon$ = NEE (noise equivalent emissivity)

$$\frac{(A_d \Delta f)^{1/2}}{0.82 D^*} = \frac{(NEE) A_0 (\Delta\theta)^2 \int_{\lambda_1}^{\lambda_2} W_\lambda d\lambda}{\pi} \qquad \text{(XXIV)}$$

The noise equivalent emissivity is then $$NEE = \frac{\pi (A_d \Delta f)^{1/2}}{0.82 D^* (A_0 (\Delta\theta)^2 \int_{\lambda_1}^{\lambda_2} W_\lambda d\lambda} \qquad \text{(XXV)}$$

$$A_d = (\Delta\Theta f)^2$$

where
f = focal length
$\Delta\Theta$ = resolution $$NEE = \frac{\pi f (\Delta f)^{1/2}}{0.82 D^* (\Delta\theta) \int_{\lambda_1}^{\lambda_2} W_\lambda d\lambda} \qquad \text{(XXVI)}$$

accounting for optical transmission, Yo and system response, Ya $$NEE = \frac{\pi f (\Delta f)^{1/2}}{0.82 D^* (MTF) \tau_0 \tau_\alpha A (\Delta\theta) \int_{\lambda_1}^{\lambda_2} W_\lambda d\lambda} \qquad \text{(XXVII)}$$

Figure 5:
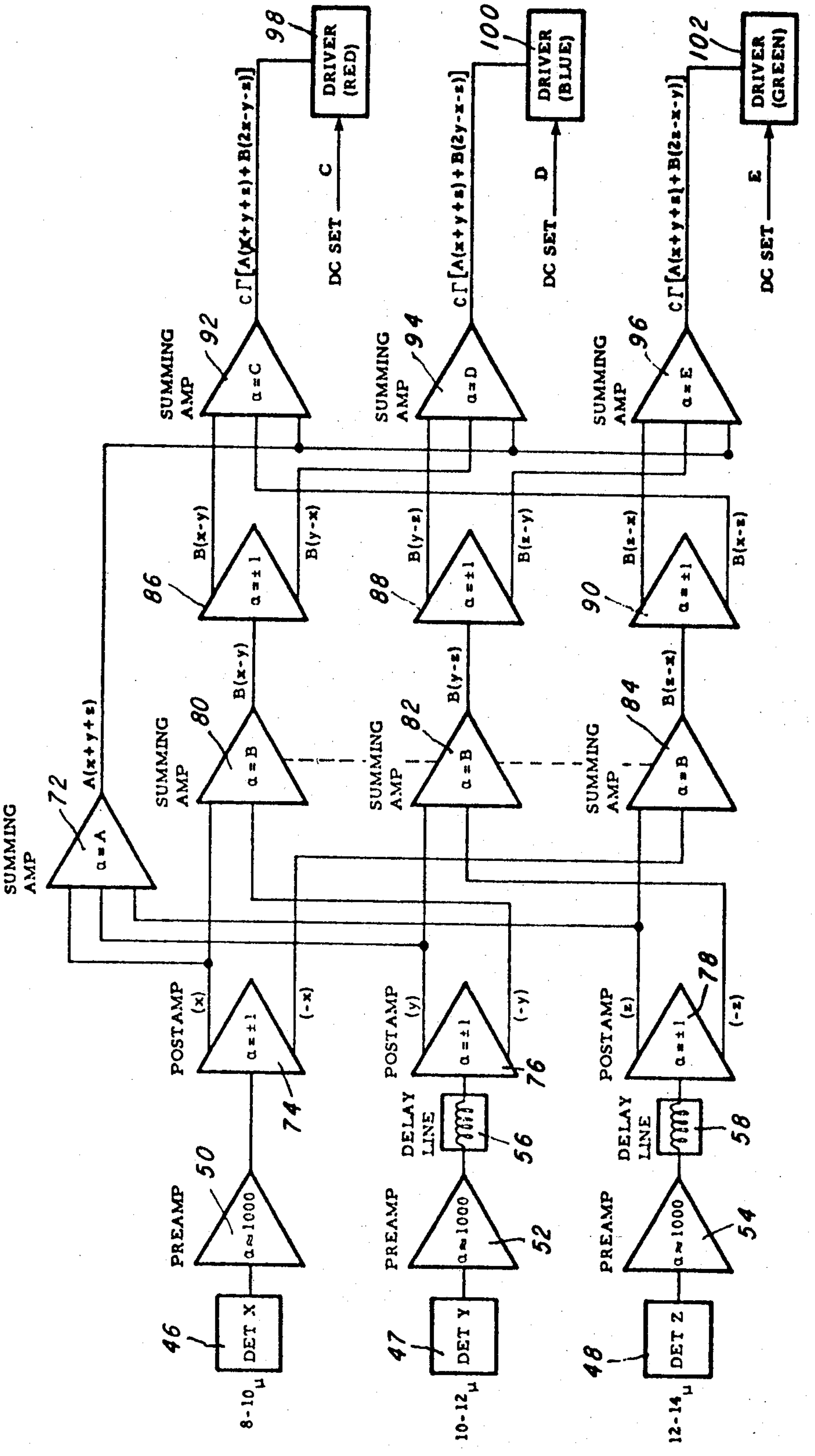
FIG. 5 is a block diagram of associated electronics for the receiver and recorder of the color infrared detecting set invention.

Proceeding now with the description of the video signal processing and enhancement control system 14, the detectors 46, 47, and 48 produce three electrical signals each of which is an input to a preamplifier 50, 52, 54 (FIG. 5). The amplifiers 50, 52, and 54 may be any standard amplifier having a gain ($\alpha$) of 1000. The preamplifiers provide the main signal gain for the system, while maintaining a high impedance load for the load detectors and a low output impedance to drive the cable to the associated electronics.

As the rate of change of the photon flux in each of the spectral bands is different, the gain of each succeeding preamplifier must ba varied to balance the signals of the preamplifiers for use in the color system. Failure to balance the signals introduces a hue signal with any change in the intensity signal caused by temperature in an unbalanced system. The largest change occurs in the 8- to 10- $\mu$m range.

The emitted photon flux between a temperature range of 280°K (7° C) to 320° K (47° C) is tabulated in Table I for the 8—10 $\mu$m, 10—12 $\mu$m, and the 12—14 $\mu$m spectral bands. Since the change in the photon flux in the 12- to 14- $\mu$m bandpass is the smallest, it will of necessity require the largest gain if the apparent electronic signals are to remain equal. Since the responsivity of the detectors is a linear function, the required gains can be calculated from the rate of change of the photon flux. Choosing 300° K (27° C) on an arbitrary means, the rate of change of the photon flux at this temperature is $$(\Delta P/\Delta T) = 5.16 \times 10^{15} \quad \text{(XXVIII)}$$

8—10 $\mu$m $$(\Delta P/\Delta T) = 5.078 \times 10^{15} \quad \text{(XXIX)}$$

tem. The change in the photon flux times the gain factor for each spectral band yields a value representative of the balanced signal in the system. Values for these weighted changes are listed under Δ in Table I for their respective optical passbands.

The problem is complicated because the changes of the photon flux with respect to temperature in the bands are not linear, but the change in photon flux of the incident radiation can be considered linear over a small change in temperature. As a result of experimenting with the operational gains on systems and their respective signal levels for temperature differences obtained in the lab, it has been determined that for an average mapping scene, 50 percent of the targets lie within ± 4 degrees K. Assuming a normal distribution for the video signal, the standard deviation would be equal to 5.39. If the distribution was normal, 1.4 percent of the targets would lie outside of ± 12 degrees K. The systems are usually set up so that the video saturates at ± 12 degrees K which yields a fairly high contrast image. At ± 12 degrees K, the assumption of linearity introduces an error of approximately $$100 \times (9.44 \times 10^{15}\ \text{photons/sec} - 9.02 \times 10^{15}\ \text{photons/sec}/9.02 \times 10^{15}\ \text{photons/sec}) = 2.5\ \text{percent} \quad \text{XXXIII}$$

TABLE I

[Emittance of a blackbody in photon/sec. cm.²]

| Temp. (° K.) | Emittance, 8–10 $\mu$m. (×10$^{17}$) | (Δ) Weight variance, 8–10 $\mu$m. (×10$^{16}$) | Emittance, 10–12 $\mu$m. (×10$^{17}$) | (Δ) Weight variance, 10–12 $\mu$m. (×10$^{16}$) | Emittance, 12–14 $\mu$m. (×10$^{17}$) | (Δ) Weight variance, 12–14 $\mu$m. (×10$^{16}$) |
|---|---|---|---|---|---|---|
| 280 | 1.940 | 9.02 | 2.511 | 9.47 | 2.668 | 9.49 |
| 282 | 2.005 | 8.37 | 2.596 | 8.607 | 2.746 | 8.754 |
| 284 | 2.089 | 7.53 | 2.684 | 7.713 | 2.824 | 7.837 |
| 286 | 2.175 | 6.67 | 2.773 | 6.808 | 2.903 | 6.909 |
| 288 | 2.263 | 5.79 | 2.864 | 5.884 | 2.984 | 5.957 |
| 290 | 2.354 | 4.88 | 2.956 | 4.949 | 3.066 | 4.993 |
| 292 | 2.447 | 3.95 | 3.050 | 3.993 | 3.148 | 4.030 |
| 294 | 2.543 | 2.99 | 3.146 | 3.018 | 3.232 | 3.040 |
| 296 | 2.640 | 2.02 | 3.243 | 2.032 | 3.317 | 2.045 |
| 298 | 2.740 | 1.02 | 3.342 | 1.026 | 3.404 | 1.023 |
| 300 | 2.842 | 0 | 3.443 | 0 | 3.491 | 0 |
| 302 | 2.946 | 1.04 | 3.545 | 1.036 | 3.579 | 1.034 |
| 304 | 3.053 | 2.11 | 3.649 | 2.093 | 3.669 | 2.092 |
| 306 | 3.162 | 3.20 | 3.755 | 3.17 | 3.759 | 3.149 |
| 308 | 3.273 | 4.31 | 3.863 | 4.268 | 3.851 | 4.23 |
| 310 | 3.386 | 5.44 | 3.972 | 5.375 | 3.944 | 5.323 |
| 312 | 3.502 | 6.60 | 4.082 | 6.493 | 4.038 | 6.427 |
| 314 | 3.620 | 7.78 | 4.195 | 7.641 | 4.133 | 7.544 |
| 316 | 3.740 | 8.98 | 4.309 | 8.800 | 4.229 | 8.672 |
| 318 | 3.862 | 10.20 | 4.924 | 9.968 | 4.326 | 9.811 |
| 320 | 3.987 | 11.45 | 4.542 | 11.167 | 4.425 | 10.970 |

10—12 $\mu$m $$P/T = 4.39 \times 10^{15} \quad \text{(XXX)}$$

12–14 $\mu$m

Figures 6, 7:
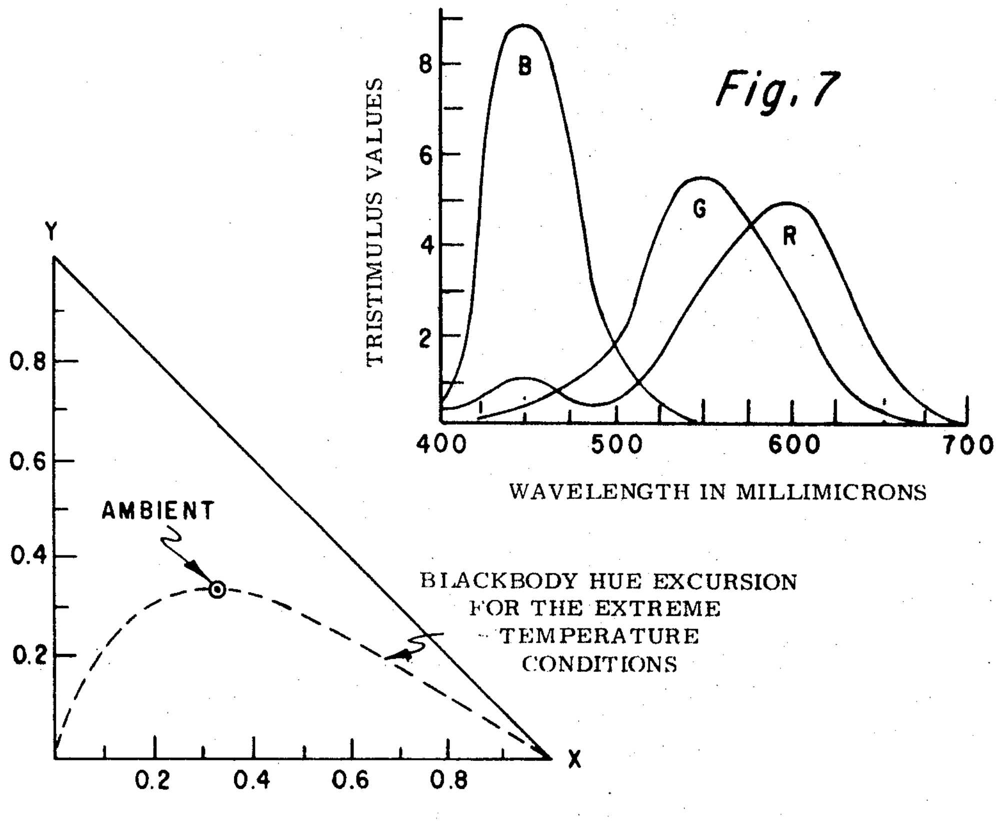
FIG. 6 is a chromaticity diagram.
FIG. 7 is a graph of the average tristimulus values for the eye of an observer.

Using the signal from the 8—10 $\mu$m spectral band X as a reference, the gain in the remaining two spectral bands Y and Z must be increased by a factor equal to the ratio of their rate of change of the photon flux and the rate of change in the reference band. Then, $$[(P/T)\ 8\text{–}10\ \mu m]/(P/T)\ 10\text{–}12\ \mu m] = 1.0162 \quad \text{(XXXI)}$$

$$[(P/T)\ 8\text{–}10\ \mu m]/(P/T)\ 12\text{–}14\ \mu m]=1.175 \quad \text{(XXXII)}$$

are the respective preamplifier gains required over the unity gain of the 8–10 $\mu m$ band X for the 10–12 and the 12–14 $\mu m$ spectral bands Y and Z. The change in the photon flux is representative of the ac signal in the sys- The dashed curve in FIG. 6 is the locus of points that represents the blackbody temperature perturbations on the system tristimulus values created when the linear assumption is invalid. Targets much hotter than the ambient drift into the $x$ region of the system unit plane and those much cooler drift into the $y$. Since the system is set up so that the image is virtually saturated at ±12K° (that is, either completely black or completely white), this effect is then virtually nonexistent. However, this does manifest itself when the intensity signal $A(x + y + z)$, hereinafter described, is reduced by lowering its gain A by a significant amount so that the color portion of the signal is predominant in the recorded image.

It will be apparent to those skilled in the art that in the system disclosed, as the image of the object (terrain) passes through the three regions X, Y and Z of the filter 44 (FIG. 4) in sequence there is a time delay in the generation of the three signals for the same object; i.e., a signal for an object will appear for region Z before it appears for Region Y, and for regions Z and Y before it appears at region X. To properly sum the signals and thereby reconstruct the image a delaying device such as, for example, a delay line 56 (FIG. 5) is connected to the output of preamplifier 52 to delay the signal of region Y until the corresponding signal appears at region X, and a delay line 58 is connected to the output of region Z to delay the signal of region Z until the corresponding signal appears at region X. It will be readily apparent that other optical arrangements can be used to generate the three time coincident signals; such arrangements can eliminate the necessity for the delaying means.

The function of the three signals will now be discussed mathematically. In a black and white system all that is required for an information match is that two patches of information appear equally intense or bright. The information match between two patches of spectral radiance, $N_1(\lambda, T_1)$ and $N_2(\lambda, T_2)$ is $$\int_0^\infty N_1(\lambda, T_1)S(\lambda)d\lambda=\int_0^\infty N_2(\lambda, T_2)S(\lambda)d\lambda \quad \text{(XXXIV)}$$

where $S(\lambda)$ is the relative spectral sensitivity of the detector-filter combination.

The spectral radiance is characterized by the equation $$N_1(\lambda, T_1) = [\epsilon(\lambda)2\pi c^2h]/(\lambda^5[\exp(ch/k\ T\ )-1]) \quad \text{(XXXV)}$$

where $\epsilon(\lambda)$ = the spectral emissivity
$c$ = velocity of light
$h$ = Planck's constant
$k$ = Boltzmann's constant
$T$ = temperature
$\lambda$ = wavelength The condition met by Equation XXXIV is that of a color-blind human and characterizes essentially a system with one degree of freedom.

Figure 8:
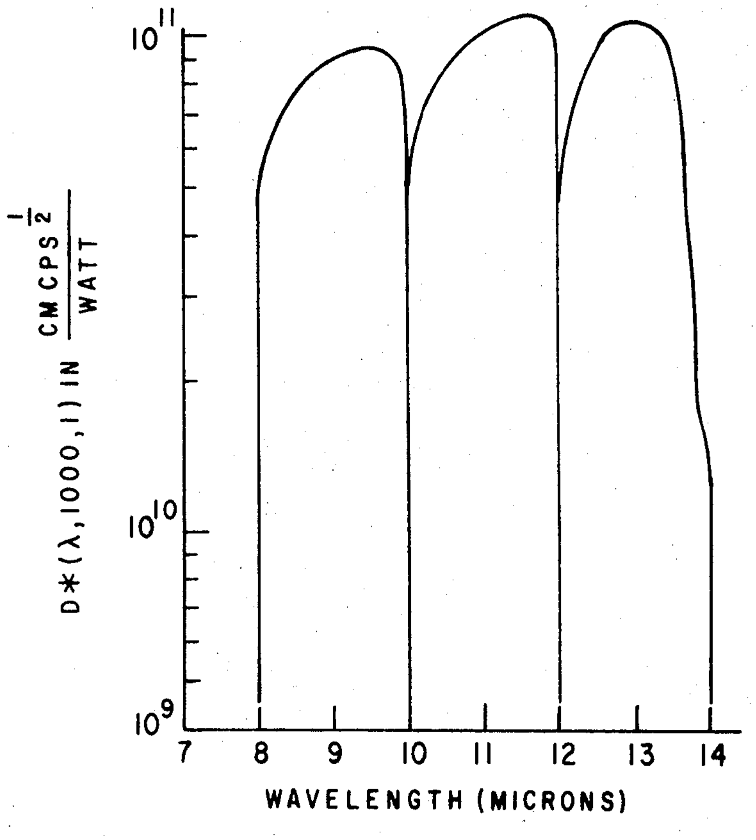
FIG. 8 is a graph of the variance of detection with wavelengths of three elements in a detector array.

Most human observers can distinguish two objects even though the radiant energy flowing from them toward the observer is so adjusted as to make them appear equally bright; that is, the objects may also differ in the red-green sense and in the yellow-blue sense. Thus, for an observer of normal color vision, the two objects must simultaneously satisfy three conditions if one is to be indistinguishable from the other, $$\int_0^\infty N_1\hat{x}d\lambda=\int_0^\infty N_2\hat{x}d\lambda \quad \text{XXXVa}$$

$$\int_0^\infty N_1\hat{y}d\lambda=\int_0^\infty N_2\hat{y}d\lambda \quad \text{XXXVb}$$

$$\int_0^\infty N_1\hat{z}d\lambda=\int_0^\infty N_2\hat{z}d\lambda \quad \text{XXXVc}$$

where, for that observer, $x$, $y$, and $z$ are tristimulus values of a spectrum of unit radiance per unit wavelength. The tristimulus value is equivalent to the relative spectral sensitivity of the detector-filter combination. The average values for an observer may be seen in FIG. 7, and the relative spectral sensitivity of three detector-filter combinations may be seen in FIG. 8.

Given this formulation for the condition necessary for a color match between objects for normal color vision, it has been found that a similar condition holds for spectral variation in the infrared. Thus, the system by incorporating this requirement for a match between objects adds two more degrees of freedom to the information obtained from a target.

Choosing the spectral response of a given sensor, it is possible to computationally determine the variation in its response as a function of the variation of the parameters of a source. The responses $x$, $y$, and $z$ for a three-sensor system are the tristimulus values of the source.

$$x=\int_0^\infty N(\lambda, T)S_x(\lambda)d\lambda \quad \text{XXXVIa}$$

$$y=\int_0^\infty N(\lambda, T)S_y(\lambda)d\lambda \quad \text{XXXVIb}$$

$$z=\int_0^\infty N(\lambda, T)S_z(\lambda)d\lambda \quad \text{XXXVIc}$$

The tristimulus values may be considered to form the tristimulus vector $$\hat{A} = \hat{X}e_x + \hat{Y}\ e_y + \hat{Z}\ e_z \quad \text{XXXVII}$$

by defining the coordinate values in an orthogonal coordinate system. Therefore, given a source, a unique tristimulus vector $\hat{A}$ is obtained which defines the parameters of its spectral emittance.

If the coordinates x, y, and z of an arbitrary infrared source are determined (perhaps indirectly through mathematical conversion), the coordinates in a system based on sources other than in the infrared (for example, in the visible range) can be found. The method in mathematics is called affine transformation.

Color photography is based on a trichromatic principle. Thus, it lends itself to the problem of converting spectral information in the infrared into the storage or memory medium from which the infrared information sought may be quickly obtained.

In color film the tristimulus value for one pigment is $$X_i=\Omega_i\int_0^\infty N(\lambda, \Omega_i)S_{1,i}(\lambda)S_{2,i}(\lambda)d\lambda \quad \text{XXXVIII}$$

where $N(\lambda,\Omega_i)$ = the unit spectral radiance of the light source
$S_{1,i}(\lambda)$ = the spectral sensitivity of the filter
$S_{2,i}(\lambda)$ = the spectral sensitivity of the pigment
$\Omega_i$ = a variable which depends on the signal driving the light source Thus, for a given system, the integral in Equation XXXVIII may be considered a constant, and the tristimulus value for the pigment is then $$x_i = C_i\Omega_i \quad \text{XXXIX}$$

The term $\Omega_i$ in a system represents the mathematical transform of the electronics. Thus, for a given target and a given $\Omega_i$, the resulting tristimulus value of the pigments of the color film can be determined.

In this preferred embodiment, the electronic transformation is built-up as follows. An intensity signal is formed by the addition of the ac signals from the three detectors 46, 47, and 48, and a gain ($\alpha$) is added to this signal such that the full range of grays on the film is utilized. If x, y, and z are the tristimulus values from the respective preamplifiers, the intensity signal fed to each light source (glow-tube), hereinafter described, is represented by $A(x+y+z)$.

The color signal is introduced as a perturbation on the intensity signal at each glow tube driver. The net effect of the three respective perturbations, however, is that there is no change in the apparent brightness of the combined light sources; that is, the total intensity of the combined glow tubes of the recorder 16 does not change with respect to a change in hue only. These three perturbations may be represented by $$B(2x-y-z) \qquad \text{XLa}$$

$$B(2y-x-z) \qquad \text{XLb}$$

$$B(2z-x-z) \qquad \text{XLc}$$

where $B$ is the weighting or gain factor of the color signals. Summing these three equations (which is what is done when looking at the intensity signal) gives a value of zero, and as stated earlier there is no apparent change in brightness. However, if different values are used for the signals of the three light source or glow tube drivers, each equation will have a unique value, and the combination of the three colors represented by these equations will represent unique hues. The combined intensity and color perturbation signals can be represented by $$A(x+y+z)+B\,(2x-y-z) \qquad \text{XLIa}$$

$$A(x+y+z)+B\,(2y-x-z) \qquad \text{XLIb}$$

$$A(x+Y+z)+B\,(2z-x-y) \qquad \text{XLIc}$$

Each represents the ac video signal of a color channel which drives a light source of the recorder 16. Each signal can demonstrate both positive and negative values, and in order to realize the full value of the signal on color film, it must be introduced into its video driver, hereinafter described, of the recorder 16 with a dc signal that sets the pedestal or background density and hue. The complete relation for the recorder light source driver is:

$$C_R+A(x+y+z)+B(2x-y-z) \qquad \text{XLIIa}$$

$$C_B+A(x+y+z)+2\,2\,y-x-z) \qquad \text{XLIIb}$$

$$C_G+A(x+y+z)+B(2z-x-y) \qquad \text{XLIIc}$$

where $C_R$, $C_B$ and $C_G$ are dc-level signals. Light sources vary in response to a voltage signal for a number of reasons, such as age and construction. Thus the values of $C_R$, $C_B$, and $C_G$ will not be equal in most real instances. The dc-level signals are characteristic of the response of the light emitter, and the ac component must be varied proportionally such that the actual emitted signal between the color channels is balanced. The ac signal must be weighted then by the proportionality factor $C_i\Gamma$, or $$C_R+C_R\Gamma\,[\,A(x+y+z)+B(2x-y-z)] \qquad \text{XLIIIa}$$

$$C_B+C_B\Gamma\,[\,A(x+y+z)+B(2y-x-z)] \qquad \text{XLIIIb}$$

$$C_G+C_G\Gamma\,[\,A(x+y+z)+B(2z-x-y)] \qquad \text{XLIIIc}$$

For emitters that are fairly uniform, $$\Gamma \cong 1/C_i$$

The last three expressions are actually the transform Equations $\Omega_i$.

The two different weighting factors A and B are required by the unique spectral variation in the 8- to 14 $\mu$m optical band. Unlike the large spectral variation of reflectance found in the 0.3- to 0.8- $\mu$m and the 1.0- to 6.0- $\mu$m optical bands (where it is not uncommon for the value of the spectral reflectance to vary from nearly zero to one through the band); the spectral variation of the value of the emissivity varies in the 8- to 14- $\mu$m band on the order of only 0.02 to 0.08 from the mean value of the emissivity throughout the band for most materials. In the 0.3- to 0.8- $\mu$m and the 1.0- to 6.0- $\mu$m optical bands (because of the large variation of the spectral reflectance) the value of the ratio B/A would be nearly unity if this transformation were used. But in the 8.0- to 14- $\mu$m band, the ratio has a value on the order of 10:1 since the variation of the tristimulus values of the detected signals does not vary as greatly as does the radiation intensity signal by about this magnitude.

If a value of unity were used for the ratio B/A in the 8- to 14- $\mu$m band and the gains on the signals were set so that the full dynamic range of the film is used to record the radiation intensity signal, the full range of color on the film would not be used. This can be corrected electronically by changing the ratio B/A so that the intensity and hue of signal is unchanged, but the level of saturation is increased to achieve the widest variance of color.

Figure 9:
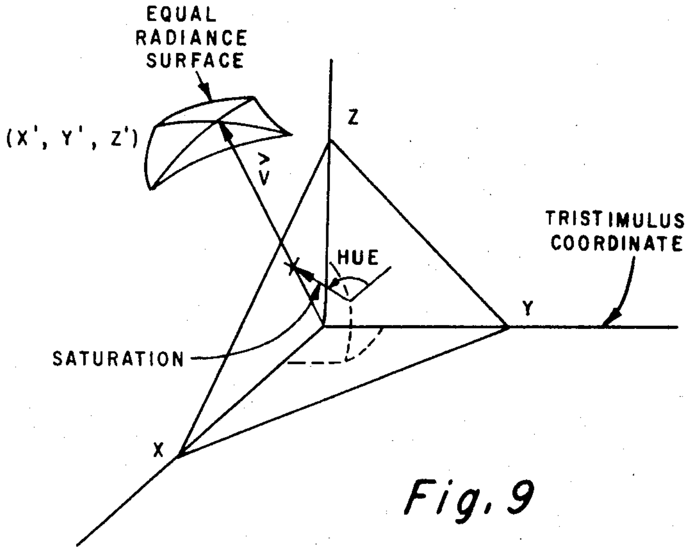
FIG. 9 is a tridimensional plot.

This correction, or what would be more properly called the addition of greater color sensitivity, can be more easily seen from the following analysis. Color data can be graphically represented by a tridimensional plot (FIG. 9). Each set of tristimulus values $(x, y, z)$ determines a vector, $\vec{V}$, in three-dimensional space starting from the origin of an orthogonal coordinate system. The magnitude of the vector $\vec{V}$ is the value of the total combined signal. The surface which defines the set of vectors that have the same magnitude as $\vec{V}$ in this coordinate system represents a total radiance level.

Thus, any other vector with a terminus at this surface will have the same magnitude as $\vec{V}$ and represents the same value for the total radiance. Hue and saturation are defined by the unit plane intersection of the vector $\vec{V}$ with the plane passing through unit amounts on each coordinate axis. The direction of a vector that is drawn from the point in which the tristimulus values are equal to the intersection point of V, indicates the chromaticity (i.e., hue of the color). The magnitude of the excursion from the point where the tristimulus values are equal to the intersection point of the radiation vector $\vec{V}$ in the unit plane indicates the saturation of the color. If the radiation signal is such that the full range of the saturation of the recording media is not used, as in this case, the tristimulus values can be adjusted so that the magnitude of $\vec{V}$ and the hue of the signal are unchanged, but the amount of saturation is increased. Thus a greater sensitivity to the amount of color would result in the recorder 16.

This is not a true representation of color in the infrared; however, the use of color in this invention is just to sense and display the spectral differences. The variations of the infrared coordinates (although more than enough to detect) are not great enough in a straight one-to-one transformation to generate the variations of coordinates which the color film is capable of recording. With the addition of the electronic modification of the tristimulus values in the transformation, a condition is created analogous to the shunting of an ammeter. The scale is changed so that smaller variations may be seen more easily. In a color system, deeper colors will result in the recording media, thus making differences more discernible.

Normalizing the transform relations $$C_R + C_R\Gamma\ [\ A(x+y+z) + B(2x-y-z)]$$

XLIVa $$C_B + C_B\Gamma\ [\ A(x+y+z) + B(2z-x-y)]$$

XLIVb $$C_G + C_G\Gamma\ [\ A(x+y+z) + B(2z-x-y)]$$

XLIVc with respect to the intensity, all the spectral data may be projected into a plane.

The normalized transform equations are for $\Gamma = 1/C_i$, $C_R = C_G = C_B$, $$[\ C_R + A(x+y+z) + B(2\,x-y-z)\ ]/(3[\ A(x+y+z) + C_R]\ ) = 1/3 + [B(2x-y-z)\ ]/(3[\ A(x+y+z) + C_R]\ )$$

XLVa $$[\ C_G + A(x+y+z) + B(2\,y-x-z)\ ]/(3[\ A(x+y+z) + C_G]\ ) = 1/3 + [\ B(2\,y-x-z)\ ]/(3[\ A(x+y+z) + C_G]\ )$$

XLVb $$[\ C_B + A(x+y+z) + B(2\,z-x-y)\ ]/(3[\ A(x+y+z) + C_B]\ ) = 1/3 + [\ B(2\,z-x-y)\ ]\ /(3[\ A(x+y+z) + C_B]\ )$$

XLVc which give the plane coordinates.

It is evident from the chromaticity coordinate given in the set of Equations XLV*a*, *b*, and *c*, that since B/A>1, it is possible for one of the coordinates to exceed unity and the other two to become negative. When this conditions occurs, the light elements of the recorder system 16 that are represented by negative numbers will be in an OFF condition and the intensity of the one having a value that exceeds unity will be higher than the intensity signal of the source would indicate. Since this condition is rare, little information is lost in this distortion of the color scale because the event itself will distinguish the material from its surroundings.

Returning now to the construction of the electronic system to perform the mathematics, the transform Equation XLIII in the video electronics is implemented through summation and subtraction of the signals from the three filtered detectors 46, 47 and 48. If $x$, $y$, and $z$ are assumed to be the electronic signals from the three detector-preamplifier combinations, then the seven basic component signals required by the system to build the transform equation are $$x - y$$

XLVIa $$y - z$$

XLVIb $$z - x$$

XLVIc $$-x + y$$

XLVId $$-y + z$$

XLVIe $$-z + x$$

XLVIf $$x + y + z$$

XLVIg

The signal represented by Equation XLVIg is the intensity or brightness signal and, with some amplification (A), drives three light modulators or summing amplifiers 92, 94, and 96 that make up one channel. The color perturbation signal is formed by summing two of the remaining color-difference signal equations. The signal $2x - y - z$ is obtained by summing Equations XLVI*a* and XLVI*f*. The signals $2y - x - z$ and $2z - x - y$ are formed by summing Equations XLVI*b* and XLV*d* and XLVIc and XLVI*e*, respectively. After some amplification (B) these perturbation signals are then summed with the intensity signal at their respective light modulators 92, 94 and 96 and the final transform equations are obtained:

$$A(x+y+z) + B(2x-y-z)$$

XLVII $$A(x+y+z)+B(2y-x-z) \qquad \text{XLVIII}$$

$$A(x+y+z)+B(2z-x-y) \qquad \text{XLIX}$$

Returning to FIG. 5 the time coincident signals $x$, $y$, and $z$ form the input respectively, to three post amplifiers 74, 76, and 78. The post amplifiers 74, 76, and 78 buffer the ac signal outputs of the preamplifiers 50, 52, and 54 and provide both noninverted and inverted signals $x$ and $-x$, $y$ and $-y$, and $z$ and $-z$ to facilitate consequent summing processes. The post amplifiers and differential amplifiers may be, for example, Motorola designated MC 1519 amplifiers.

The noninverted ac signals $x$, $y$ and $z$ are fed to a summing amplifier 72 where they are summed unweighted and the output level adjusted by amplification (A) to produce the $A(x+y+z)$ brightness signal of equation XLVIg. The value of A is set, for example, by a variable potentiometer, not shown, which is varied by an operator to control the shades of gray produced from white to black. The summing amplifier 72 may be, for example, a Texas Instruments designated SN 52741 amplifier.

The noninverted ac signals $x$, $y$ and $z$ are also fed, respectively, to three summing amplifiers 80, 82 and 84 where they are summed with the inverted outputs $-x$, $-y$, and $-z$ of the post amplifiers 74, 76, and 78 as follows: the $-x$ output is connected to the summing amplifier 84, the $-y$ output is connected to the summing amplifier 80, and the $-z$ output is connected to summing amplifier 82. The amplification or gain B of the summing amplifiers 80, 82, and 84 is controlled simultaneously, for example, by a three decked potentiometer (not shown); thus, the gain B is set by one control. The output signals for summing amplifiers 80, 82 and 84 are respectively the $B(x-y)$, $B(y-z)$ and $B(z-x)$ of equations XLVI*a*, *b*, and *c*. These ac output signals are coupled, respectively, to another set of differential amplifiers 86, 88, and 90 which produce noninverted and inverted ac signals, i.e., differential amplifier 86 provides $B(x-y)$ and $B(y-x)$ signals, differential amplifier 88 provides $B(y-z)$ and $B(z-y)$ signals, and differential amplifier 90 provides $B(z-x)$ and $B(x-z)$ signals. These ac signals are the color-difference signals and are dependent primarily on the emissivity of the object (terrain in a mapping system) and not the temperature of the object.

Light modulators or summing amplifiers 92, 94, and 96 are each connected to the output of summing amplifier 72 to receive as one input the intensity signal $A(x+y+z)$. In addition, summing amplifier 92 is connected to the output of summing amplifier 86 to receive as a second input the $B(x-y)$ signal, and to the output of differential amplifier 90 to receive as a third input the $B(x-z)$ signal. The summing amplifier sums and amplifies these signals to produce an output signal equivalent to $C\Gamma[A(x+y+z)+B(2x-y-z)]$. Similarly, summing amplifier 94 is connected to differential amplifiers 86 and 88 to sum and amplify the $B(y-x)$ and $B(y-z)$ signals with the $A(x+y+z)$ signal to produce at its output a signal equivalent to $D\Gamma[A(x+y+z)+B(2y-x-z)]$. And summing amplifier 96 is connected to differential amplifiers 88 and 90 to sum and amplify the $B(z-y)$ and $B(z-x)$ signals with the $A(x+y+z)$ signal to produce at its output a signal equivalent to $E\Gamma[A(x+y+z)+B(2z-x-y)]$. The amplification or gains C, D, and E are fixed precentages relative to one another so as to give a gray shade image of an object or image on color film when the emissivity is the same in all three filter regions X, Y and Z.

The ac output signals of the light modulators or summing amplifiers 92, 94, and 96 are coupled as one input, respectively to glow tube drivers 98, 100, and 102. Also coupled to the glow tube drivers 98, 100, 102, respectively, are dc signals which set the pedestal or background density and hue. The glow tube drivers 98, 100 and 102 provide the input signals to the recorder system 16.

Figure 1:
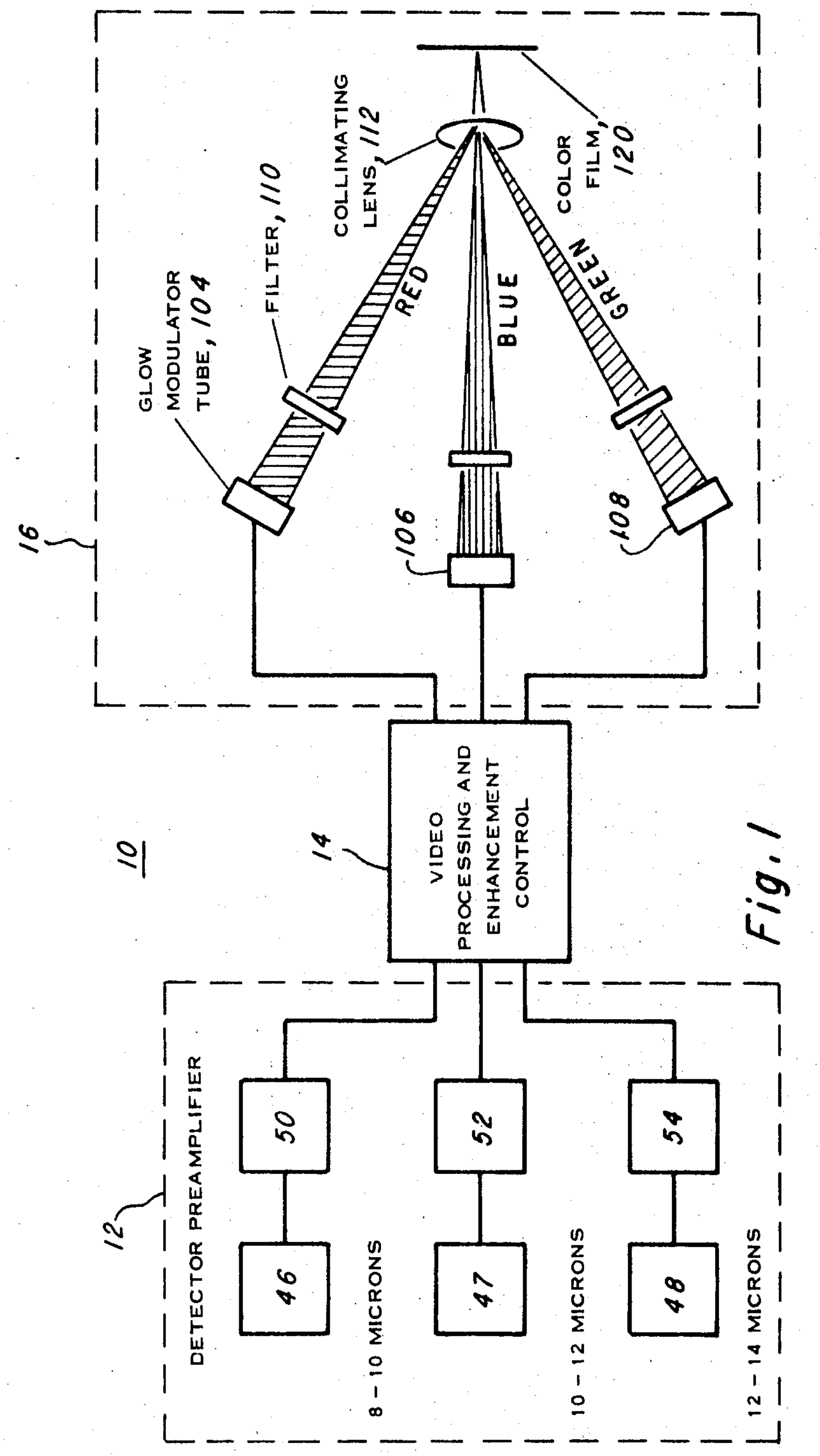
FIG. 1 is a block diagram of the color infrared detecting set constituting the subject matter of the invention.

The display or recorder system 16 (FIG. 1) includes red, blue and green light sources which may be, for example, light emitting diodes or a red glow tube 104 connected to the output of driver 98, (FIG. 5) a blue glow tube 106 connected to the output of driver 100, and a green glow tube 108 connected to the output of driver 102. Each of the glow tubes 104, Ektachrome film 106, and 108 has a filter 110 (FIG. 10) for transmitting the desired red, blue, or green wavelengths of the visible spectrums to a collimating lens 112 arranged about a rotating drum 114 which is attached to the scan mirror rotating shaft 28. The drum 114 contains a stationary fiber optics 116 for receiving the light from the glow tubes 104, 106, and 108, mixing it and transporting it to a set of four microscopes 118 carried by the rotating drum for focusing the colored light to a fine point on the color film 120. Although any color film can be used, a suitable film is that sold under the trademark Ektachrome by Eastman Kodak Co. Each microscope 118 corresponds to one side of the scan mirrors 24 and rotates in phase with a face of the mirror 24. The film 120 is carried by film holding spool 122 having a suitable brake 124 for preventing back lash of the film and take up spool 126 driven by a servo motor 128 at a proper speed for recording the continuous scan of the scan mirror 24 on the film 120. A film shaping platen, not shown, is positioned above the path of the rotating microscopes 118 for curving the film 120 in a circular arc corresponding to the circular path of the rotating microscopes. In this position the film shaping platen maintains the film equidistant from the rotating microscopes. Although, a film type recorder is described, it will be readily apparent to one skilled in the art that a real time display may be employed without departing from the scope of this invention.

To analyze the resulting exposed film it is necessary to determine the tristimulus values and the chromaticity coordinates in the Commission Internationale de l'Eclairage (CIE) system for various materials. The values of the integrals in Equation XXXV*a–c* are designated as tristimulus values $x_i$. The amounts of $N_1$, $N_2$, and $N_3$ of any three emitters of radiant flux required to produce by additive mixture any color, $\dot{x}\dot{y}\dot{z}$, may be computed from Equation XXXV*a–c*. Let a unit amount of the first emitter combination (e.g., the red glow tube with its associated filter and film response) have tristimulus values $x_r$, $y_r$, $z_r$; the second (the green combination) $x_g$, $y_g$, $z_g$; and the third (the blue combination) $x_b$, $y_b$, $z_b$. It follows from XXXV*a–c* that the tristimulus values $x$, $y$, of the color produced by adding $N_1$ units of the red emitter and $N_2$ units of the green to $N_3$ units of the blue are:

$$x = x_r\,N_1 + x_g\,N_2 + x_b\,N_3 \quad \text{La}$$

$$y = y_r\,N_1 + y_g\,N_2 + y_b\,N_3 \quad \text{Lb}$$

$$z = z_r\,N_1 + z_g\,N_2 + z_b\,N_3 \quad \text{Lc}$$

The CIE color system provides a Standard Observer to complete the description of the color of an object. The 1931 CIE Standard Observer is a numerical description of the response to color of the normal eye and is expressed by color-matching functions $\bar{x}$, $\bar{y}$, and $\bar{z}$. The recording film is high-speed Ektachrome. The chromaticity coordinates for unit amounts of radiant flux or system-signal levels in the recorder are obtained through Equation Equation LI. This procedure is tabulated in TABLE 2. The dye in the CIE system has the following coordinates:

| Blue | Green | Red |
|---|---|---|
| $x + 0.1511$ | $x = 0.3136$ | $x = 0.618$ |
| $y = 0.0425$ | $y = 0.623$ | $y = 0.351$ |
| $z = 0.8063$ | $z = 0.0632$ | $z = 0.0308$ |

and for any tristimulus value from the video processor $N_1$, $N_2$, $N_3$, the color coordinates are $$x = 0.618\ N_1 + 0.1511\ N_2 + 0.3136\ N_3 \quad \text{LI}$$

$$y = 0.315\ N_1 + 0.0425\ N_2 + 0.623\ N_3$$

$$z = 0.031\ N_1 + 0.8063\ N_2 + 0.0632 N_3$$

TABLE 2

FILM CIE COORDINATES

| Wave Length μm | N | $N\bar{x}$ | $N\bar{y}$ | $N\bar{z}$ | Chromaticity coord. for unit signals |
|---|---|---|---|---|---|
| | | BLUE | | | |
| 340 | | | | | |
| 360 | 7 | | | | |
| 380 | 30 | 0.066 | | 0.195 | $x = 0.1511$ |
| 400 | 51 | 0.729 | 0.02 | 3.462 | $y = 0.0425$ |
| 420 | 50 | 6.72 | 0.2 | 32.28 | $z = 0.8063$ |
| 440 | 35 | 12.19 | 0.805 | 61.145 | |
| 460 | 22 | 6.40 | 1,32 | 36.72 | |
| 480 | 14 | 1.34 | 1.95 | 11.38 | |
| 500 | 7 | 0.034 | 2.261 | 1.9 | |
| 520 | 1.7 | 0.11 | 1.21 | 0.1329 | |
| Total | | 27.59 | 7.776 | 147.2 | |
| | | GREEN | | | |
| 380 | 1.7 | 0.0024 | | 0.011 | |
| 400 | 3.5 | 0.5 | 0.0014 | 0.2376 | $x = 0.3136$ |
| 420 | 2.7 | 0.363 | 0.011 | 1.743 | $y = 0.623$ |
| 440 | 1.8 | 0.627 | 0.041 | 3.145 | $z = 0.0632$ |
| 460 | 2.0 | 0.582 | 0.12 | 3.338 | |
| 480 | 3.5 | 0.335 | 0.487 | 2.845 | |
| | | GREEN | | | |
| 500 | 11.0 | 0.054 | 3.553 | 2.992 | |
| 520 | 33 | 2.09 | 23.43 | 2.581 | |
| 540 | 65 | 18.88 | 62.01 | 1.320 | |
| 560 | 65 | 38.64 | 64.67 | 0.2535 | |
| 580 | 32 | 29.32 | 27.84 | 0.0544 | |
| 600 | 1 | 1.0622 | 0.631 | 0.0008 | |
| Total | | 92 | 182.8 | 18.52 | |

A mathematical model of the system can be constructed by use of Equation L and the transform Equation LI; this will yield a close approximation to what should be expected as far as color content by a known spectral emissivity. Remaining in units of photon flux since the responsivity acts as a constant that would eventially drop out, Equation L can be used to obtain the tristimulus values for the video processing using the weighted differences in the photon flux obtained from the product of the emissivity and the total flux. Setting $C = 6 \times 10^{16}$ photons/sec cm², which is the photon flux equivalent to ±12°K limits on the saturation of the system, $\Gamma = I/C$ and the ratio B/A set at a value of 10, the tristimulus values and the chromaticity coordinates in the CIE system for two materials are tabulated in Table 3.

TABLE 3

THEORETICAL CHROMATICITY COORDINATES IN THE CIE SYSTEM FOR DIFFERENT MATERIALS AT 300°K

| Wave Length (λ) | Emissivity (ε) | System Tristimulus ($N_i$) | Chromaticity Coordinates ($x_i$) | |
|---|---|---|---|---|
| **8-10 μm** | **0.988** | **0.610** | **0.526** | |
| | | | | Paint |
| **10-12 μm** | **0.921** | **.173** | **.109** | Zinc oxide |
| **12-14 μm** | **0.940** | **0.217** | **0.365** | base |
| **8-10 μm** | **0.911** | **0.163** | **0.288** | |
| | | | | Silt Loam |
| **10-12 μm** | **0.975** | **0.462** | **.401** | |
| | | | | Tennessee |
| **12-14 μm** | **0.967** | **0.526** | **0.311** | |

Only two are shown but are representative of the data used.

The same process was used with a prototype three-color infrared film imaging system to develop the chromaticity coordinates for objects as they appeared on the film. This took into account the spectral response of the filters used in the densitometer. What appeared to be a painted roof top on a metal building and a field with bare soil were used as representative data points. Their chromativity coordinates are presented in Table 4.

TABLE 4

CHROMATICITY COORDINATES IN THE CIE COORDINATES SYSTEM FOR TARGETS ON FILM

| Color | Wave Length (λ) | System Film transmission ($T_i$) | System Film Tristimulus Values ($x_i$) | Chromaticity Coordinates ($x_i$) |
|---|---|---|---|---|
| **Red** | **8-10 μm** | **0.087** | **0.1427** | **0.3054** |
| **Blue** | **10-12 μm** | **0.275** | **0.4653** | **0.3880** Soil |
| **Green** | **12-14 μm** | **0.229** | **0.3875** | **0.3066** |
| **Red** | **8-10 μm** | **0.089** | **0.519** | **0.492** |
| | | | | **Painted** |
| **Blue** | **10-12 μm** | **0.042** | **0.238** | **0.199** |
| | | | | **Roof** |
| **Green** | **12-14 μm** | **0.041** | **0.243** | **0.309** |

These two sets of chromaticity coordinates of the two data points (soil and paint), are representative of the data obtained from the test flights and tabulated emissivity values published by the University of Michigan. The difference between the theoretical and experimental coordinates is due to the rough way the data was handled and would be minimized by obtaining more representative spectral data of the light sources used in the system recorder and the densitometer employed to obtain spectral data from the film.

Although only a single embodiment of this invention has been described herein, it will be apparent to a person skilled in the art that various modifications to the details of construction shown and described may be made without departing from the scope of this invention.

What is claimed is:

1. A color infrared detecting set comprising:

a. an infrared receiver for receiving radiating energy from a source thereof and producing a plurality of electrical signals responsive to selected wavelengths;

b. a video signal processing and enhancement control means responsive to the plurality of electrical signals of the infrared receiver for selectively combining the plurality of electrical signals to produce a plurality of enhanced color signals; and c. display means responsive to the enhanced color signals for producing a color image.

2. An apparatus according to claim 1 wherein the infrared receiver comprises a plurality of infrared filters defining regions for passing radiant energy of selected wavelengths, and a plurality of infrared detectors responsive to radiant energy passing the plurality of infrared filters for producing a corresponding plurality of electrical signals.

3. An apparatus according to claim 2, wherein the said filters define regions among the 8 to 14 micrometer wavelengths.

4. An apparatus according to claim 2, wherein said filters define three regions having wavelengths of about 8–10 micrometers, 10–12 micrometers, and 12–14 micrometers.

5. An apparatus according to claim 1, wherein the infrared detectors are low-energy-gap, high mobility materials of the group consisting of lead tin telluride, lead sulfide, indium antimonide, mercury cadmium telluride, and mercury doped germanium.

6. An apparatus according to claim 1, wherein said display means comprises a system for producing an image in real time responsive to the enhanced color signals of the signal processing and enhancement control means.

7. An apparatus according to claim 6, wherein said display means includes a color picture producing plate.

8. An apparatus according to claim 1, wherein said display means comprises a system for producing a continuing color image.

9. An apparatus according to claim 8, wherein said display means comprises a plurality of light source means responsive to the enhanced color signals of the signal and enhancement control means for producing primary colors, and light mixing means responsive to the light from the plurality of light source means to combine the light for establishing a match with a given color to produce a color image.

10. An apparatus according to claim 9, wherein said plurality of light source means comprises color light emitting diodes responsive to the enhanced color signal output of the signal and enhancement control means.

11. An apparatus according to claim 9, wherein said plurality of light source means comprises a plurality of glow-tubes, and a corresponding plurality of visible color filters, each filter responsive to the light emitted by its corresponding glow-tube for producing a primary color.

12. An apparatus according to claim 11, wherein said light mixing means further comprises a light focusing means and a light sensitive display means, said light focusing means responsive to the combined light to focus the combined light on the light sensitive recording means, and said display means responsive to the focused mixed light for producing a color image.

13. A method of detecting infrared energy comprising the steps of:

a. receiving infrared energy from a source thereof;

b. converting the infrared energy to a plurality of electrical signals representative of selected wavelengths of the infrared energy;

c. processing by selectively combining the plurality of electrical signals to produce enhanced color signals from said plurality of electrical signals representative of selected wavelengths of the infrared energy, and d. producing from the enhanced color signals a color image of the source of infrared energy.

14. A method according to claim 13, wherein the step of receiving infrared energy from a source thereof comprises scanning the source of infrared energy with an optical system for collecting and focusing radiant energy.

15. A method according to claim 13, wherein the step of converting infrared energy to a plurality of electrical signals representative of selected wavelengths of the infrared energy comprises passing the radiant energy received from the source thereof through a plurality of radiant energy filters to a plurality of radiant energy detectors.

16. A method according to claim 15, wherein the radiant energy is passed sequentially through the plurality of radiant energy filters.

17. A method according to claim 13, wherein the step of processing enhanced color signals comprises amplifying the electrical signals of the detectors, summing the plurality of electrical signals for each of said plurality of radiant energy detectors to produce a signal indicative of the brightness of the source, selectively combining the plurality of signals to produce a plurality of color signals, and summing the signals to produce a plurality of enhanced color of signals.

18. A method according to claim 13, wherein the step of producing a color image of the source of infrared energy comprises converting the enhanced color signals to a plurality of visible colors and combining the colors to produce an image having a hue representative of the source of radiant energy.

19. A method according to claim 18 wherein the image is recorded on color film.

20. An apparatus according to claim 1, wherein said video signal processing and enhancement control system comprises a first signal processing channel operative to produce from the electrical signal output of the infrared receiver a signal to control the total brightness in the display means, and a second signal processing channel operative to produce, from the electrical signal output of the infrared receiver, color-difference signals, said first and second signal processing channels operatively coupled to produce the plurality of enhanced color signals for the display means.

21. An apparatus according to claim 20 wherein said video signal processing and enhancement control means comprises a plurality of preamplifiers having input terminals coupled to the detector outputs of the infrared receiver to amplify and balance the output signals of the plurality of detectors to produce signals and for alleviating the introduction of a hue signal with any change in temperature, and output terminals coupled to the first and second signal processing channels.

22. An apparatus according to claim 21 further comprising a delay means selectively coupled to preamplifiers of the plurality of preamplifiers for producing time coincident signals as the output signals of the plurality of preamplifiers.

23. An apparatus according to claim 20, wherein the first signal processing channel includes a summing amplifier, said summing amplifier responsive to the detector outputs of the infrared receiver for producing a signal indicative of the brightness of the source of energy.

24. An apparatus according to claim 20, wherein the second signal processing channel includes a plurality of identical circuits coupled to the detector outputs of the receiver, the first circuit of the plurality of circuits including a first signal inverting and signal noninverting means coupled to a first detector output of the receiver for producing an inverted signal and noninverted signal from the detector output; a first signal summing means coupled to the signal noninverting output of the first signal inverting and noninverting means and coupled to the signal inverting output terminal of the first signal inverting and signal noninverting means of a second one of said plurality of circuits for combining the noninverted output signal of the first detector with the inverted output of a second detector; a second signal inverting and signal noninverting means coupled to the output of the first summing means for producing inverted and noninverted signals from the output of the first summing means; a second signal summing means having an input terminal coupled to the output of the first signal processing channel, an input terminal coupled to the noninverted output of the second signal inverting and noninverting means of the first circuit, and an input terminal coupled to the inverted ouput of a second signal inverting and noninverting means of a third circuit for selectively combining the total brightness signal of the first channel with the noninverted signal of the second signal inverting and noninverting means of the first circuit, and the inverted signal of the second signal inverting and noninverting means of the third circuit, to produce an enhanced color difference signal; and a light source driver having one input terminal coupled to the output of the second signal summing means for receiving a color-difference signal, and a second input terminal for connection to a pedestal signal.

* * * * *